UNITED STATES PATENT OFFICE.

WELLS H. SHEARER, OF ARKANSAS CITY, KANSAS.

PAINT.

SPECIFICATION forming part of Letters Patent No. 464,336, dated December 1, 1891.

Application filed May 13, 1891. Serial No. 392,586. (No specimens.)

*To all whom it may concern:*

Be it known that I, WELLS H. SHEARER, a citizen of Arkansas City, in the county of Cowley and State of Kansas, have invented certain new and useful Improvements in Paint; and I do hereby declare the following to be a full, clear, and exact description of the invention, such as will enable others skilled in the art to which it appertains to make and use the same.

My invention relates to an improvement in paints, and has for its object to produce a paint which shall be water-proof and fire-proof.

A further object is to produce an improved paint adapted to be applied to wood, metal, brick, stone, paper, or articles or structures of any material whatsoever capable of receiving paint.

With these objects in view the invention consists in certain combinations of ingredients for the production of an improved water-proof and fire-proof paint, as hereinafter set forth, and pointed out in the claims.

The compound constituting my improved paint consists of the following ingredients: coal-tar, fifty gallons; pitch, twenty-five pounds; common mineral paint, two and one-half pounds; hydraulic cement, five pounds; gray ocher, two and one-half pounds; asbestus, (in powder form,) four pounds; air-slaked lime, five pounds; dairy salt, two pounds; liquid drier, one-half gallon; litharge, one pound.

In preparing the paint for shipment the tar and pitch are first melted and mixed together. The mineral, cement, ocher, asbestus, salt, litharge, and lime will then be well mixed together in a suitable mortar or other vessel and added to the melted tar and pitch and thoroughly mixed together, and to this compound the liquid drier is added and mixed.

When the paint is to be applied to tin, paper, or iron, the lime may, if desired, be omitted; but when the paint is to be applied to brick, stone, wood, or similar porous material I prefer to include the lime. Other ingredients—such as the drier or the pitch—may be omitted, if desired.

When stone, brick, wood, or other porous material shall have been coated with my improved paint, the pores will be effectually closed and such articles rendered water-proof. Bricks used in buildings and sidewalks are usually very porous, and when laid in walks become filled with water. When this absorbed water freezes, the bricks are liable to crack and peel and the walk or pavement often seriously damaged. To render such bricks water-proof, and thus prevent water from entering them, they may be painted with or immersed in my improved paint. The paint will when dry become very hard and durable.

My improved paint may also be used for the preservation of wooden structures which are exposed to the action of the weather—such, for instance, as posts, fences, &c. It will also adhere to new tin without the necessity of waiting for the tin to rust. It may also be applied to any metal and also to ropes used in water, tents, awnings, hose, horse-blankets, &c. It is also useful in painting shingle roofs. When applied in this connection, the paint will provide the shingles with a water-proof coating and the joints of the shingles will be filled with paint and water prevented from working its way beneath them.

The paint may be used to provide numerous articles with water-proof coatings.

I do not wish to be understood as restricting myself to the exact proportions herein stated, as such proportions may be varied to some extent without affecting the result to be accomplished; but, Having fully described my invention, what I claim as new, and desire to secure by Letters Patent, is—

1. The water-proof paint herein described, consisting of tar, pitch, common mineral paint, hydraulic cement, ocher, asbestus, salt, and litharge, in substantially the proportions stated.

2. The water-proof paint herein described, consisting of coal-tar, pitch, common mineral paint, hydraulic cement, gray ocher, asbestus, air-slaked lime, salt, liquid drier, and litharge, in substantially the proportions stated.

3. A water-proof paint consisting of paint, tar, cement, asbestus, lime, dairy-salt, and litharge.

In testimony whereof I have signed this specification in the presence of two subscribing witnesses.

WELLS H. SHEARER.

Witnesses:
G. W. KELLY,
CHARLES A. HOWARD.